United States Patent
Hagi et al.

(10) Patent No.: US 10,519,311 B2
(45) Date of Patent: Dec. 31, 2019

(54) POLYURETHANE ELASTOMER COMPOSITION AND BEARING MATERIAL

(71) Applicant: NOK CORPORATION, Tokyo (JP)

(72) Inventors: Yoichi Hagi, Ibaraki (JP); Asahi Kitagawa, Ibaraki (JP); Yuichi Suzuki, Ibaraki (JP)

(73) Assignee: NOK Corporation, Tokyo (JP)

( * ) Notice: Subject to any disclaimer, the term of this patent is extended or adjusted under 35 U.S.C. 154(b) by 55 days.

(21) Appl. No.: 16/027,527

(22) Filed: Jul. 5, 2018

(65) Prior Publication Data

US 2019/0016886 A1   Jan. 17, 2019

(30) Foreign Application Priority Data

Jul. 12, 2017   (JP) ................. 2017-135930

(51) Int. Cl.
| | | |
|---|---|---|
| *C08L 75/04* | (2006.01) | |
| *C08G 18/76* | (2006.01) | |
| *C08G 18/48* | (2006.01) | |
| *F16C 27/06* | (2006.01) | |
| *F16C 17/14* | (2006.01) | |
| *C08G 18/42* | (2006.01) | |
| *F16C 33/20* | (2006.01) | |
| *F16C 33/22* | (2006.01) | |
| *C08K 3/22* | (2006.01) | |

(52) U.S. Cl.
CPC .......... *C08L 75/04* (2013.01); *C08G 18/4277* (2013.01); *C08G 18/4854* (2013.01); *C08G 18/7621* (2013.01); *C08G 18/7671* (2013.01); *F16C 17/14* (2013.01); *F16C 27/06* (2013.01); *F16C 33/201* (2013.01); *C08K 2003/2289* (2013.01); *C08L 2205/025* (2013.01); *C08L 2205/03* (2013.01); *F16C 33/22* (2013.01); *F16C 2208/12* (2013.01)

(58) Field of Classification Search
CPC ............ C08G 18/7671; C08G 18/7621; C08G 18/4854; C08G 18/4277; C08L 75/04; C08L 2205/025; C08L 2205/03; F16C 27/06; F16C 33/201; F16C 33/22; F16C 17/14; F16C 2208/12

See application file for complete search history.

(56) References Cited

U.S. PATENT DOCUMENTS

| | | | | |
|---|---|---|---|---|
| 4,206,102 A | * | 6/1980 | Britain | ............ C08K 3/04 524/507 |
| 5,739,188 A | * | 4/1998 | Desai | ............ C08K 5/0008 524/140 |
| 2009/0239987 A1 | * | 9/2009 | Siddhamalli | ....... C08G 18/4854 524/412 |

FOREIGN PATENT DOCUMENTS

| | | |
|---|---|---|
| JP | 2009-120722 | 6/2009 |
| JP | 2013-007006 | 1/2013 |

* cited by examiner

*Primary Examiner* — Christopher M Rodd
(74) *Attorney, Agent, or Firm* — The Marbury Law Group, PLLC

(57) ABSTRACT

Provided are a polyurethane elastomer composition excellent in the abrasion resistance and swelling resistance, and a bearing material formed of the polyurethane elastomer composition. The polyurethane elastomer composition contains a polyurethane elastomer of 100 parts by mass, polyethylene wax of 3~25 parts by mass, and paraffin wax of 1~10 parts by mass. Further, preferably the polyurethane elastomer composition contains a cobalt based compound of 0.1~10 parts by mass.

4 Claims, No Drawings

POLYURETHANE ELASTOMER COMPOSITION AND BEARING MATERIAL

CROSS-REFERENCE TO RELATED APPLICATION

This application claims priority to Japanese Unexamined Patent Application Publication No. 2017-135930 filed Jul. 12, 2017, the disclosure of which is hereby incorporated in its entirety by reference.

BACKGROUND OF THE INVENTION

1. Technical Field

The present invention relates a polyurethane elastomer composition and a bearing material formed of the polyurethane elastomer composition.

2. Description of the Related Art

A bearing material of a propeller shaft used for ships plays important roles in prevention of water entrance from the outside of a ship, holding of a propeller shaft and help for smooth rotation thereof. Two types of lubrication applicable to a bearing material are known including an oil lubrication type and a water lubrication type. However, the water lubrication type has been more adopted because the oil lubrication type has a concern of marine pollution due to leakage of a lubrication oil.

As a bearing material in case of a water lubrication type, used are materials including rubber, PTFE (polytetrafluoroethylene) and a polyurethane elastomer. Among those materials, rubber needs investment in an expensive mold for producing a bearing material, and PTEF is a high priced material. Therefore, a low priced and easy molding polyethylene elastomer has been adopted in certain cases. However, a polyurethane elastomer cannot be said to have sufficient performance in abrasion resistance.

Hereby, many investigations have been developed for achieving more improvement in abrasion resistance of the polyurethane elastomer. For example, Japanese Unexamined Patent Application Publication No. 2009-120722 discloses a method for adding a PTFE powder to a polyurethane elastomer. Further, Japanese Unexamined Patent Application Publication No. 2013-7006 discloses a method for adding polyethylene wax to a polyurethane elastomer.

However, both methods disclosed in Patent Documents 1 and 2 have more room for improving performance in the abrasion resistance, for example, reducing a coefficient of dynamic friction and a friction depth.

Further, there is a concern that swelling of a bearing material tightens a propeller shaft thereby to increase starting torque, leading to an increase in an abrasion loss of the bearing material in a water lubrication type. Thus, another important property required for the bearing material is to keep a volume change rate thereof in water at a low level.

SUMMARY OF THE INVENTION

The present invention has been made from the viewpoint of the drawbacks thus described above. Therefore, an object of the present invention is to provide a polyurethane elastomer composition excellent in the abrasion resistance and swelling resistance, and a bearing material formed of the polyurethane elastomer composition.

The present inventors have keenly investigated a method for improving the abrasion resistance of a polyurethane elastomer. This investigation has led to findings that both the coefficient of dynamic friction and the friction depth can be improved while keeping the swelling resistance via applying a predetermined amount of polyethylene wax and paraffin wax in combination to a polyethylene elastomer so as to realize the present invention. Specifically, the present invention has the following compositions.

A polyurethane elastomer composition of the present invention includes a polyurethane elastomer of 100 parts by mass, polyethylene wax of 3~25 parts by mass, and paraffin wax of 1~10 parts by mass. Further, the polyurethane elastomer composition of the present invention preferably includes a cobalt based compound of 0.1~10 parts by mass. Moreover, a bearing material of the present invention is formed of the polyurethane elastomer composition.

Accordingly, the polyurethane elastomer composition and the bearing material of the present invention are excellent in the abrasion resistance as well as the swelling resistance.

DETAILED DESCRIPTION OF THE EMBODIMENTS

Hereinafter, embodiments of the present invention will be described in detail. However, the scope of the present invention is not limited to the embodiments described below. Note, the mark of "~" used herewith means that numerals described before and after the mark are included as a lower limit and an upper limit.

First, the present inventors have focused on additives for providing a polyurethane elastomer composition with abrasion resistance. Hereby, it was found that polyethylene wax has superior miscibility with a polyurethane elastomer to ester based wax and amide based wax, and effectively decreases a coefficient of dynamic friction and a friction depth of the polyurethane elastomer. However, it was also found that polyethylene wax does not always have enough performance in the abrasion resistance which has been targeted by the present invention.

Hence, the present inventors have investigated additives further serving improvement in the abrasion resistance of the polyurethane elastomer. That investigation resulted in findings that use of paraffin wax in a predetermined formulation effectively works for achievement of the improvement. It is construed herein that paraffin wax has a function contributing to performance of the polyurethane elastomer, for example, abrasion resistance thereof via bleeding of paraffin wax itself on a surface of the polyurethane elastomer. Further, the present inventors have also found out that a cobalt based compound is an effective additive for more drastically improving a level of the friction depth.

A polyurethane elastomer composition of the present invention includes a polyurethane elastomer, polyethylene wax and paraffin wax. Hereinafter, the respective components forming the polyurethane elastomer composition will be described more specifically.

(Polyurethane Elastomer)

The polyurethane elastomer is produced by a reaction between a diisocyanate and a compound having 2 or more active hydrogens such as a polyol and a diamine compound.

Generally, a polyol is used for a compound having 2 or more active hydrogens. Such a polyol includes various types of polyols, for example, a polyester based polyol, a polyether based polyol, a polycarbonate based polyol, a silicone based polyol, a 1,4-polybutadiene based polyol, a 1,2-polybutadiene based polyol, and a caster-oil based polyol. Those polyols are appropriately used alone or via mixed in combination.

Examples of the polyol include a polycaprolactone polyol produced by a ring-opening polymerization of caprolactone; a polyester polyol produced by a condensation reaction between a dibasic acid and a glycol; and a polyether polyol such as polyethylene glycol, polypropylene glycol, polycarbonate polyol and polytetramethylene glycol (PTMG). Among those polyols, preferably used are polytetramethylene glycol (PTMG) and a polycaprolactone polyol.

Preferably, the polyol has a number average molecular weight (Mn) of 500~4000, more preferably 1000~3000. Further, preferably the polyol has hydroxy groups having the number of 30~150, and more preferably 40~100.

The diisocyanate includes, for example, aromatic diisocyanates such as o-tolidine diisocyanate, 3,3'-dimethylbiphenyl-4,4'-diisocyanate (TODI), tolylene diisocyanate (TDI), xylylene diisocyanate (XDI), 4,4'-diphenylmethane diisocyanate (MDI), polymeric MDI, 1,2-diphenylethane diisocyanate, phenylene diisocyanate and 1,5-naphthalene diisocyanate; aliphatic diisocyanates such as tetramethylene diisocyanate and hexamethylene diisocyanate (HDI); and alicyclic diisocyanates such as isophorone diisocyanate and hydrogenated XDI. Those diisocyanates are used alone or via mixed in combination. Among those diisocyanates, preferably used are tolylene diisocyanate (TDI) and 4,4'-diphenylmethane diisocyanate (MDI).

(Polyethylene Wax)

Polyethylene wax is a polyethylene with a low molecular weight. Polyethylene wax having a melting point of 45° C.~110° C. is preferably used. The polyethylene wax may be modified polyethylene wax or oxidized polyethylene wax partially oxidized. The polyethylene wax may be available as a commercial product including, for example, "Mitsui Hi-Wax™" (Mitsui Chemicals, Inc.), "Sunwax™" (Sanyo Chemical Industries, Ltd.), "Epolene™" (Eastman Chemical Company), "Alliedwax™" (Allied Signals Co.), and "ETA-1" (Matsumoto Yushi-Seiyaku Co., Ltd.).

The polyethylene wax of 3~25 parts by mass, preferably 5~20 parts by mass is blended per polyethylene elastomer of 100 parts by mass. When the blended amount of the polyethylene wax is smaller than the above defined range, the friction depth tends to be increased. On the contrary, when the blended amount thereof is greater than the above defined range, the hardness of material is remarkably decreased, whereby the polyurethane elastomer composition fails to exert sufficient performance as a shaft bearing.

(Paraffin Wax)

Paraffin wax is a general term of linear saturated hydrocarbons having 20 or more carbon atoms, and solid at ambient temperature. The paraffin wax is poor in miscibility with the polyurethane elastomer, which facilitates bleeding on a surface of a molded product.

The paraffin wax of 1~10 parts by mass, preferably 3~7 parts by mass is blended per polyurethane elastomer of 100 parts by mass. When the blended amount of the paraffin wax is smaller than the above defined range, the friction depth tends to be increased. On the contrary, when the blended amount thereof is greater than the above defined range, the miscibility of the polyurethane elastomer with the paraffin wax is insufficient. The insufficient miscibility tends to increase the friction depth.

(Cobalt Based Compound)

Hardness of a cobalt based compound is high so that the compound is excellent in abrasion resistance and heat resistance. Such a cobalt based compound includes, for example, tricobalt tetraoxide, ($Co_3O_4$), cobalt sulfate ($CoSO_4$), and cobalt chloride ($CoCl_2$) or the like. Addition of those cobalt based compounds is effective for improving the abrasion resistance of the polyurethane elastomer. Preferably, the cobalt based compound of 0.1~10 parts by mass, more preferably 0.5~5 parts by mass is blended per polyurethane elastomer of 100 parts by mass.

When the blended amount of the cobalt based compound is smaller than the above defined range, the abrasion loss tends to be increased. On the contrary, when the blended amount of the cobalt based compound is greater than the above defined range, poor dispersion is caused. The poor dispersion may damage an opposite material like a shaft and so on.

(Polyurethane Elastomer Composition)

When a molded product of the polyurethane elastomer is produced, performed is a method having the steps of producing beforehand a linear prepolymer via polymerization between a polyol and a diisocyanate, and preparing a molded product via using the linear prepolymer.

More specifically, a chain extender (i.e., a curing agent) is added to the prepolymer thus prepared in advance, and the resulting mixture is injected into a heated mold or the like, thereby cross-linking and curing the mixture. As a result, a molded product of the polyurethane elastomer is produced.

A prepolymer of the polyurethane elastomer can be prepared under the conditions of heating a mixture of the polyol and diisocyanate at about 80~ about 150° C. for about 10 min~about 2 hr.

Here, a prepolymer of the polyurethane elastomer is commercially available, and therefore a commercial product may be used for the above production method. Such a commercial product includes, for example, ADIPRENE™ LF (Chemchura Co.), VULKOLLAN™ and Bitec™ (Bayer AG), and Echelon (Dow Chemical Company).

As for a chain extender, diols applied to preparation of polymers other than a polycarbonate are utilized including, for example, a mixture of one or more types of glycols having 4~6 carbon atoms such as 1,4-butandiol, 1,6-hexanediol, 2,3-butandiol and trimethylolpropane; or a mixture of one or two types of glycols having a side chain such as a methyl group and an ethyl group. Among those mixtures, preferably used is a mixture of 1,4-butandiol and trimethylolpropane. For example, a mixture of 1,4-butandiol and trimethylolpropane having the mole rate of 80:20~99:1 is preferably used. Further, the chain extender is preferably used at the content of 1~20 mass % per total amount of the polyurethane elastomer composition.

Moreover, as for the chain extender, used are an aliphatic amine compound, an aromatic amine compound, and a mixture thereof. For example, such a chain extender includes aliphatic amines such as ethylenediamine, 1,3-diaminopropane, 1,4-diaminobutan, hexa-methylenediamine, aminoethanolamine, 1,4-diaminocyclohexane, isophoronediamine (IPDA), and triethylenetetramine. Preferably, the chain extender includes aromatic amines, for example, 3,3'-dichloro-4,4'-diaminodiphenylmethane (MOCA), 2,4-diaminotoluene, 2,6-diaminotoluene, 1,5-naphthalenediamine, 1,4-phenylenediamine, 1,4-diaminobenzene, 4,4'-methylenebisdianiline (MDA), 3,5-diethyl-2,4-diaminotoluene, 3,5-diethyl-2,4-diamine-toluene, diethyltoluenediantine (DETDA), tri-methyleneglycol diaminobenzoate (TMGDAB), 4,4-methylenebis (3-chloro-2,6-diethyl-aniline) (MCDEA), and 3,3',5,5'-tetraisopropyl-4,4'-methylene-bisaniline.

Such a chain extender may be available as a commercial product. Examples of the commercial product include, for example, 1,4-BD [Mitsubishi Chemical Corporation, (1,4-butanediol)], ND [KURARAY CO., LTD., (1,9-nonanediol), and TMP [Mitsubishi Gas Chemical Company, Inc., (trimethylolpropane)].

Here, the polyurethane elastomer composition may be appropriately blended with a filler, a metal oxide, a metal hydroxide, a lubricant, and an anti-oxidant besides the above respective components as necessary.

A molded product of the polyurethane elastomer composition may be further subjected to secondary cross-linking under the conditions of 100~150° C. for 5~24 hr after being molded.

Hardness of the polyurethane elastomer composition is not specifically limited. However, hardness thereof is preferably set to 60~70 of the JIS K6253 D hardness as long as the composition is applied to a shaft bearing or the like.

Cross-linking and curing the polyurethane elastomer composition may afford dimensional stability, thereby to improve swelling resistance thereof. Further, it is presumed that combined blending of the polyethylene wax and paraffin wax thus listed above contributes to improvement in the swelling resistance against water.

The polyurethane elastomer composition of the present embodiment is excellent in the abrasion resistance and swelling resistance. Therefore, the polyurethane elastomer composition is suitable for application to a bearing material or the like for a propeller shaft of ships and so on.

EXAMPLES

Hereinafter, the present invention will be described in more detail referring to the following Examples.

Example 1

To ADIPRENE™ LF 750D (Chemchura Corporation) of 100 parts by mass, added were polyethylene wax (ETA-1, Matsumoto Yushi-Seiyaku Co., Ltd.) of 13.1 parts by mass and paraffin wax (Paraffin Wax 120, NIPPON SEIRO CO., LTD.) of 5.9 parts by mass, and the resulting mixture was preliminary stirred for 2 min. Then, 3,3'-dichloro-4,4'-diaminodiphenylmethane (hereinafter, referred to as MOCA) of 27 parts by mass was added as a chain extender to the mixture, and the resulting mixture was stirred for 45 sec. After that, the mixture was poured into a mold preliminary heated at 120° C. so as to be molded. After released from the mold, the resultant product was heat-treated at 115° C. for 15 hr, thereby to produce a molded product of the polyurethane elastomer composition. Note, ADIPRENE™ LF 750D is a prepolymer of polytetramethylene glycol (PTMG) and tolylenediisocyanate (TDI).

Example 2

A molded product of the polyurethane elastomer composition was produced the same as in Example 1 except that tricobalt tetraoxide (ISE CHEMICAL CORPORATION) of 1.2 parts by mass was further added to the polyurethane elastomer composition of Example 1.

Comparative Example 1

To ADIPRENE™ LF 750D (Chemchura Corporation) of 100 parts by mass, added was polyethylene wax (ETA-1, Matsumoto Yushi-Seiyaku Co., Ltd.) of 3.9 parts by mass, and the resulting mixture was preliminary stirred for 2 min. Then, MOCA of 27 parts by mass was further added to the mixture, and the resulting mixture was stirred for 45 sec. After that, the mixture was poured into a mold preliminary heated at 120° C. so as to be molded. After released from the mold, the resultant product was heat-treated at 115° C. for 15 hr, thereby to produce a molded product of the polyurethane elastomer composition.

Comparative Example 2

A molded product of the polyurethane elastomer composition was produced the same as in Comparative Example 1 except that the content of polyethylene wax (ETA-1, Matsumoto Yushi-Seiyaku Co., Ltd.) of Comparative Example 1 was changed to 22.4 parts by mass.

Comparative Example 3

A molded product of the polyurethane elastomer composition was produced the same as in Comparative Example 1 except that the content of polyethylene wax (ETA-1, Matsumoto Yushi-Seiyaku Co., Ltd.) of Comparative Example 1 was changed to 7.4 parts by mass, and paraffin wax (Paraffin Wax 120, NIPPON SEIRO CO., LTD.) of 15 parts by mass was further added to the composition.

(Evaluation of Physical Properties)

The molded products of the polyurethane elastomer compositions thus obtained were evaluated in physical properties by collecting test pieces from the molded products, respectively.

<Evaluation Items>

1. Ordinary Physical Properties (1) Hardness: based on JIS K6253:2012, hardness was measured by using a type D durometer.

(2) Tensile properties: based on JIS K6251:2010, tensile strength (Mpa) and an elongation at break (%) were measured by using a test piece in the dumbbell shaped type 5.

2. Abrasion Resistance Properties

Following JIS K7218:1986, the Suzuki-type friction and abrasion test was conducted by Method A (ring vs. disk). A coefficient of dynamic friction and a friction depth (i.e., friction loss) were measured by setting the opposite material to SUS304 and under the sliding conditions of 139 mm/s×2 Mpa in water.

Results of the coefficient of dynamic friction were determined as follows: "Excellent" when the coefficient was less than 0.14, "Good" when the coefficient was 0.14 or more and less than 0.16, "Poor" when the coefficient was 0.16 or more and less than 0.17, and "Bad" when the coefficient was 0.17 or more.

Further, results of the friction depth were determined as follows: "Excellent" when the depth was less than 20 μm, "Good" when the depth was 20 μm or more and less than 50 μm, "Poor" when the depth was 50 μm or more and less than 100 μm, and "Bad" when the depth was 100 μm or more.

3. Swelling Resistance Property

The swelling resistance property was evaluated following JIS K6258:2003. A test piece with a size of φ29×2 mm was prepared, and the test piece was immersed in warm water at 50° C. for 72 hr. Then, volumes before and after the immersion were measured to give a volume change rate (%).

Results of the volume change rate were determined as follows: "Excellent" when the rate was less than 1.0%, "Good" when the rate was 1.0% or more and less than 1.2%, "Poor" when the rate was 1.2% or more and less than 1.5%, and "Bad" when the rate was 1.5% or more.

Results of the evaluation were listed in Table 1.

TABLE 1

| | | | | Example 1 | Example 2 | Comparative Example 1 | Comparative Example 2 | Comparative Example 3 |
|---|---|---|---|---|---|---|---|---|
| Blending Composition | Prepolymer | PTMG/TDI | Pts. Mass | 100 | 100 | 100 | 100 | 100 |
| | Chain Extender | MOCA | Pts. Mass | 27 | 27 | 27 | 27 | 27 |
| | | Polyethylene Wax | Pts. Mass | 13.1 | 13.1 | 3.9 | 22.4 | 7.4 |
| | | Paraffin Wax | Pts. Mass | 5.9 | 5.9 | — | — | 15 |
| | | Tricobalt Tetraoxide | Pts. Mass | — | 1.2 | — | — | — |
| Physical Properties | Hardness | | — | D66 | D66 | D70 | D65 | D63 |
| | Tensile Strength | | Mpa | 40.6 | 38.7 | 57.3 | 40.5 | 36.6 |
| | Elongation at Break | | % | 170 | 180 | 260 | 210 | 170 |
| Evaluation | Abrasion Resistance | Coefficient of Dynamic Friction | — | 0.15 | 0.13 | 0.17 | 0.16 | 0.15 |
| | | Result | | Good | Excellent | Bad | Poor | Good |
| | | Abrasion Depth | μm | 40 | 10 | 1500 | 129 | 100 |
| | | Result | | Good | Excellent | Bad | Bad | Bad |
| | Swelling Resistance | Volume Change Rate | % | 1.0 | 1.0 | 1.7 | 1.4 | 0.4 |
| | | Result | | Good | Good | Bad | Poor | Excellent |

The results in Table 1 revealed the following features.

Comparison analyses of Example 1 to Comparative Examples 1 and 2 demonstrate that combined use of the polyethylene wax and paraffin wax realizes not only a great increase in the abrasion resistance but also improvement in the swelling resistance. Further, the comparison analyses of Example 1 to Example 2 demonstrate that combined use of the polyethylene wax and paraffin wax and additional blending of tricobalt tetraoxide realize a further increase in the abrasion resistance.

In contrast, Comparative Examples 1 and 2 where no paraffin wax was blended show the inferior abrasion resistance and slightly inferior swelling resistance. Comparative Example 3 where the blended amount of paraffin wax was large shows that the swelling resistance was excellent, while the abrasion resistance was inferior.

What is claimed is:

1. A polyurethane elastomer composition, comprising a polyurethane elastomer of 100 parts by mass, polyethylene wax of 3~25 parts by mass, and paraffin wax of 1~10 parts by mass.

2. The polyurethane elastomer composition according to claim 1, further comprising a cobalt based compound of 0.1~10 parts by mass.

3. A bearing material, formed of the polyurethane elastomer composition according to claim 1.

4. A bearing material, formed of the polyurethane elastomer composition according to claim 2.

* * * * *